United States Patent Office 3,422,561
Patented Jan. 21, 1969

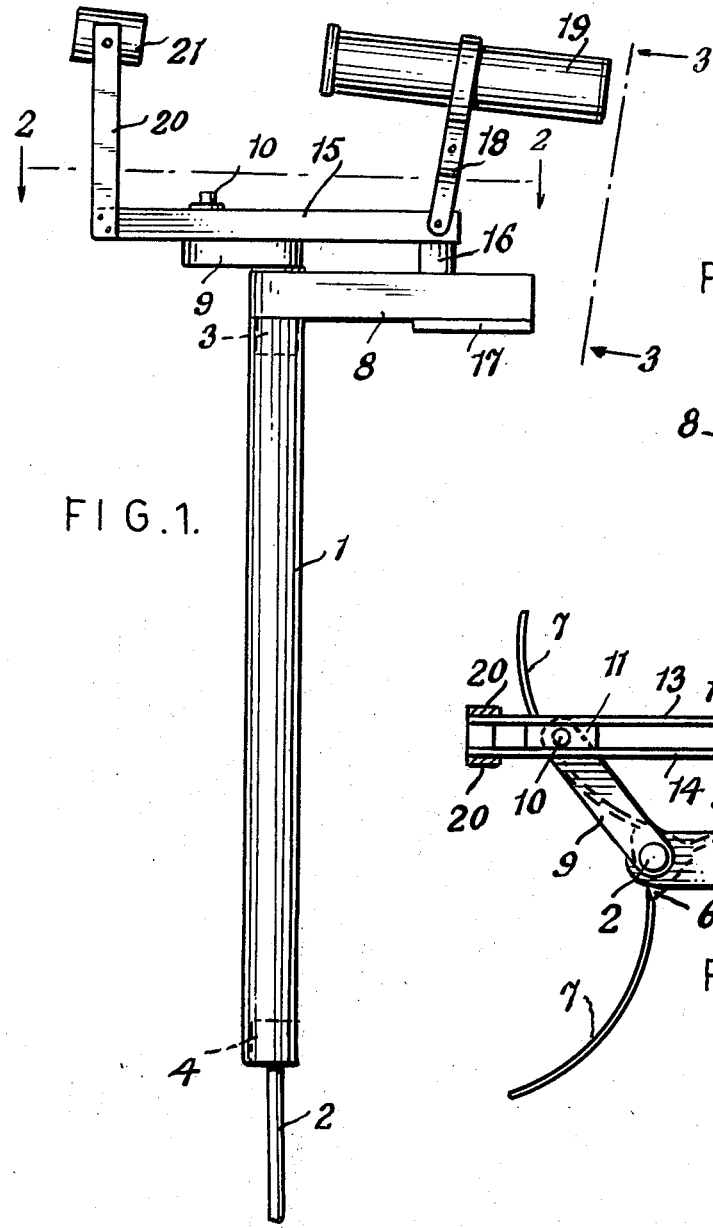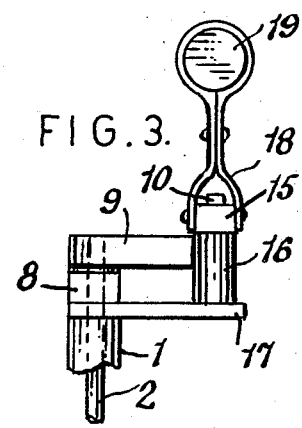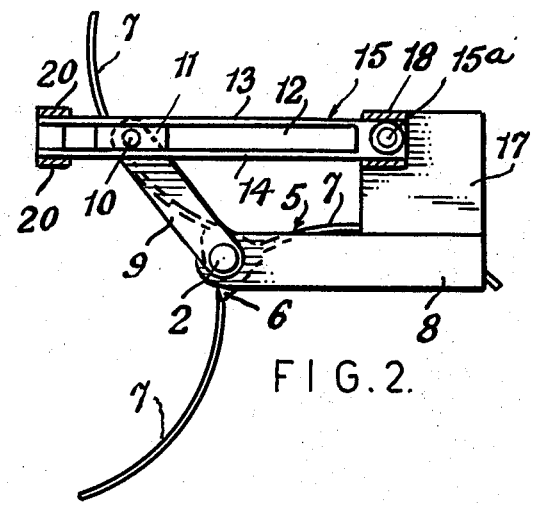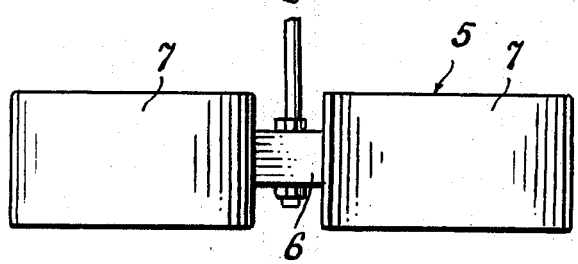

3,422,561
TROLLING DEVICE FOR FISHING
David A. McLean, 248 Hibiscus Ave.,
Lauderdale-by-the-Sea, Fla. 33308
Filed Apr. 5, 1967, Ser. No. 628,775
U.S. Cl. 43—19.2       6 Claims
Int. Cl. A01k 87/00

ABSTRACT OF THE DISCLOSURE

A trolling device for attachment to a boat and having a shaft carrying a rotor which is disposed in the water and as the boat moves forwardly the shaft is rotated by the action of the water on the rotor. A fishing rod is carried by supporting means located on a slotted and pivoted bar, and a crank arm extends between the slot in said bar and the upper end of the shaft for oscillating the bar and fishing rod.

---

The fisherman, when engaged in trolling from a moving boat, finds it desirable to impart a swinging movement to the fishing rod, which movement is repeatedly performed to impart spasmodic movement to the lure or bait on the line, and thus attract the fish. After some time, the effort involved in so moving the rod can become tiring and the pleasure in fishing thus becomes considerably diminished. It is therefore an object of the present invention to provide a device which will automatically impart an oscillating movement, or back and forth swing to a fishing rod, resembling the swing imparted to it by the usual manual efforts of a fisherman, and without requiring any effort on his part, whereby the manual effort involved in trolling activity will be eliminated.

With these and other objects to be hereinafter set forth in view, I have devised the arrangement of parts to be described and more particularly set forth in the claims appended hereto.

In the accompanying drawing, wherein an illustrative embodiment of the invention is disclosed, FIG. 1 is an elevational view of a trolling device constructed in accordance with the invention;

FIG. 2 is a sectional view, taken substantially on the line 2—2 of FIG. 1, looking in the direction of the arrows; and FIG. 3 is a view taken on the line 3—3 of FIG. 1, looking in the direction of the arrows.

Referring to the drawing, 1 indicates a relatively lengthy sleeve or tube, which in the suggested use of the device, is clamped or otherwise suitably attached to the side of a boat by any one of a number of types of clamps or other suitable secure fastening devices. Disposed axially within the sleeve 1 is a rotatable shaft 2 which is mounted for free rotation in suitable bearings 3 and 4 located respectively in the tube at or near its opposite ends. The shaft 2 extends below the lower end of the sleeve to a desired extent, and mounted on the lower end of the propecting portion of the shaft 2 is a rotor or propeller generally indicated at 5, the same in the form shown, consisting of a hub 6 having projecting curved blades or vanes 7 which extend radially from the hub.

This arrangement is such that when the device is mounted on a boat as above described, the rotor 5 will be submerged in the water and upon forward movement of the boat through the water, the rotor or propeller 5 will be rotated by the action of the water on it and the shaft 2 rotated accordingly.

Fixedly mounted on the upper end of the tube 1 is a laterally projecting fixed arm 8, the shaft 2 extending therethrough and being rotative in the bearing 3 adjacent to the arm 8. Secured on the upper end of the shaft 2 is one end of a crank arm 9 which has its opposite end pivotally attached at 10 to a slide block 11, guided in a slot 12 defined by the longitudinal sides 13 and 14 of a bar 15.

At one end the bar 15 is pivoted at 15a in a boss or bearing 16 extending upwardly from a base plate 17 attached to or formed integrally with the under side of the stationary arm 8. Secured at the end of the bar 15 adjacent to the pivot 15a is a clamp 18 which is adjustable as to angularity of position and as to height if desired, and the clamp embraces a tubular rod socket or cup 19. At the opposite end of the bar 15 is a pair of uprights 20 which embrace a rod-supporting clip 21 at their upper ends.

From the foregoing, the operation of the device will be readily apparent. With a fishing rod supported in the socket 19 and clip 21, and the device mounted upon the boat as herein described, and with the rod extending outwardly from the side of the boat, the action of the water upon the rotor or propeller 5 as the boat moves through the water, will cause the rotation of the shaft 2. The crank arm 9, being fixedly mounted upon the upper end of the shaft 2, will be rotated along with the shaft. The end of the crank arm, being connected to the slide block 11, will impart an oscillatory movement to the rod-supporting bar 15, swinging the same back and forth and hence the rod, supported in the socket 19 and clip 21, will be swung back and forth, subjecting the lure or bait on the fishing line to the desired trolling movement that is usually performed by the manual effort of the fisherman.

The device, when installed on a boat, and used as above described, requires no manual effort on the part of the fisherman and will be found to enable effective trolling to be performed without the tiring exertion encountered in relatively long periods of trolling.

What I claim is:

1. A trolling device for fishing rods comprising, a shaft, a rotor mounted on the shaft and adapted to be disposed in the water from a boat and caused to rotate the shaft as the boat moves through the water, a crank arm carried by the shaft, a pivoted bar carrying rod-supporting means, the crank arm being slidably connected to the bar so that when the shaft is rotated by the action of the water on the rotor, the crank arm will impart an oscillating movement to the bar and to a fishing rod carried thereon.

2. A trolling device according to claim 1, wherein the shaft is contained within a sleeve, a fixed arm projecting laterally from one end of the sleeve for supporting said pivoted bar, the crank arm being attached at one end to one end of the shaft, the opposite end of the shaft carrying the rotor, the second end of the crank arm being connected to a slide block that is slidably mounted in a slot in the bar, one end of the bar carrying a rod socket and the opposite end of the bar carrying a rod-engaging clip.

3. A trolling device comprising, a support for attachment at the side of a boat, a rotatable shaft carried by the support, propelling means carried by the shaft and entrant into the water and rotative by forward movement of the boat therein, a rod support and means connecting said rod support to the shaft and by which an oscillating movement is imparted to the rod support by movement of the boat through the water.

4. A trolling device according to claim 3, wherein the support for attachment to the side of a boat is a tube and the shaft extends axially through the same, the rod support being a pivoted, slotted bar and the means which connects the bar to the shaft being a crank arm secured at one end of the shaft and having its other end pivotally and slidably attached in the slot in the bar.

5. A trolling device according to claim 4, wherein the shaft propelling means consists of radial vanes on the shaft at one end thereof, the connection between the crank arm and the slotted bar consisting of a slide block movable in the slot in the bar.

6. A trolling device for use by fisherman comprising, a tube for vertical disposition at the side of a boat, a plurality of vanes attached to a shaft rotative within the tube, said vanes being disposed in the water and cause to rotate the shaft upon movement of the boat through the water, a crank arm mounted at one end on an end of the shaft, a bracket mounted on the top of the tube, a bar pivoted at one end on said bracket, the bar having means for supporting a fishing rod, the bar being provided with a longitudinal slot, a slide block mounted for sliding movement in the slot, the crank arm having its second end pivoted to the slide block, the rotative movement of the shaft causing the crank arm to impart an oscillating movement to the bar and to the fishing rod supported thereby.

References Cited

UNITED STATES PATENTS

| | | | |
|---|---|---|---|
| 2,643,478 | 6/1953 | Paulsen | 43—19.2 |
| 3,031,790 | 5/1962 | Duryea | 43—26.1 X |
| 3,126,180 | 3/1964 | Mandolare | 43—21.2 X |

WARNER H. CAMP, *Primary Examiner.*

U.S. Cl. X.R.

43—26.1